United States Patent [19]

Lee et al.

[11] 4,173,614

[45] Nov. 6, 1979

[54] PROCESS FOR PREPARING A POLYCRYSTALLINE DIAMOND BODY/SILICON NITRIDE SUBSTRATE COMPOSITE

[75] Inventors: Minyoung Lee, Schenectady; Lawrence E. Szala, Scotia; Robert C. De Vries, Burnt Hills, all of N.Y.

[73] Assignee: General Electric Company, Schenectady, N.Y.

[21] Appl. No.: 889,107

[22] Filed: Mar. 22, 1978

Related U.S. Application Data

[62] Division of Ser. No. 844,449, Oct. 21, 1977.

[51] Int. Cl.$^2$ .............................................. B24D 3/08
[52] U.S. Cl. ...................................... 264/332; 51/307; 51/308
[58] Field of Search .......................... 51/307, 308, 309; 264/332

[56] References Cited

U.S. PATENT DOCUMENTS

| | | |
|---|---|---|
| 3,617,347 | 11/1971 | Kuratomi ................................ 51/295 |
| 3,850,591 | 11/1974 | Wentorf, Jr. ............................ 51/309 |
| 3,852,078 | 12/1974 | Wakatsuki et al. .................... 51/309 |
| 3,913,280 | 10/1975 | Hall ........................................ 51/309 |

Primary Examiner—Donald J. Arnold
Attorney, Agent, or Firm—Jane M. Binkowski; Joseph T. Cohen; Leo I. MaLossi

[57] ABSTRACT

A mass of diamond crystals in contact with a mass of eutectiferous silicon-rich alloy and a silicon nitride ceramic substrate are disposed in a container and placed within a pressure transmitting powder medium. Pressure is applied to the powder medium resulting in substantially isostatic pressure being applied to the container and its contents sufficient to dimensionally stabilize the container and its contents. The resulting shaped substantially isostatic system of powder-enveloped container is hot-pressed whereby fluid eutectiferous silicon-rich alloy is produced and infiltrated through the interstices between the diamond crystals and contacts the contacting face of the silicon nitride substrate sufficiently producing, upon cooling, an adherently bonded integral composite.

7 Claims, 7 Drawing Figures

PROCESS FOR PREPARING A POLYCRYSTALLINE DIAMOND BODY/SILICON NITRIDE SUBSTRATE COMPOSITE

This is a division of application Ser. No. 844,449, filed Oct. 21, 1977.

This invention relates to the production of a polycrystalline diamond body/silicon nitride substrate composite comprised of a dense mass of diamond crystals bonded to a silicon nitride substrate. The diamond crystals are bonded together and to the silicon nitride substrate by a silicon atom-containing bonding medium.

One of the technical barriers to a high density (high volume of diamond in a body) diamond base compact made below the diamond stable pressure region has been the development of a suitable binder material which will infiltrate the capillaries of a densely packed fine particle size diamond powder. The binder must form a thermally stable strong bond with diamond and should not graphitize or excessively react with the diamond.

The present invention utilizes a eutectiferous silicon-rich alloy which infiltrates well through the capillaries of a compressed mass of diamond crystals and which wets the crystals to form a strong cemented diamond body. In addition, the infiltrating alloy forms a strong bond in situ with a silicon nitride substrate. The present process also utilizes pressures substantially below those required by the diamond stable region to produce a polycrystalline diamond body/silicon nitride substrate composite in a number of configurations and a wide range of sizes. It is useful as an abrasive, cutting tool, nozzle or other wear-resistant part.

Briefly stated, the present process for preparing a polycrystalline diamond body/silicon nitride composite includes a hot-pressing step and comprises placing within a protective container or cup a mass of solid eutectiferous silicon-rich alloy, or solid components for producing eutectiferous silicon-rich alloy, a mass of diamond crystals and a silicon nitride substrate, said mass of diamond crystals being intermediate and in contact with said substrate and said mass of solid eutectiferous silicon-rich alloy, or with at least one of said components for providing eutectiferous silicon-rich alloy being composed of silicon and a metal which forms a silicide with said silicon, disposing said container and its contents within a pressure transmitting powder medium that transmits applied pressure substantially undiminished and remains substantially unsintered during said hot-pressing, applying sufficient substantially isostatic pressure to said container and its contents via said powder medium to substantially stabilize the dimensions of said container and said contents substantially uniformly producing a shaped substantially isostatic system of powder-enveloped container wherein the density of the resulting compressed mass of diamond crystals is higher than 70% by volume of the volume of said compressed diamond crystals, hot-pressing the resulting substantially isostatic system producing fluid infiltrating eutectiferous silicon-rich alloy and infiltrating said fluid eutectiferous silicon-rich alloy through the interstices of said compressed mass of diamond crystals and into contact with the contacting surface of said substrate, said hot-pressing being carried out at an hot-pressing temperature below 1600° C. under a hot-pressing pressure sufficient to infiltrate said fluid silicon-rich alloy through the interstices of said compressed mass of diamond crystals, said solid eutectiferous silicon-rich alloy, or solid components for eutectiferous silicon-rich alloy being used in an amount sufficient to produce sufficient fluid eutectiferous silicon-rich alloy at said hot-pressing temperature to fill the interstices of said compressed mass of diamond crystals and contact the contacting surface of said substrate, said hot-pressing being carried out at an atmosphere which has no significant deleterious effect on said diamond crystals or on said infiltrating fluid silicon-rich alloy or on said silicon nitride substrate, said hot-pressing converting less than 5% by volume of said diamond crystals to non-diamond elemental carbon, said non-diamond carbon or the surfaces of said diamond crystals reacting with said fluid infiltrating silicon-rich alloy forming carbide, maintaining sufficient pressure on the resulting hot-pressed substantially isostatic system during cooling thereof to at least substantially maintain the dimensions of said hot-pressed system, and recovering the resulting polycrystalline diamond body-silicon nitride substrate composite wherein the diamond crystals are present in an amount of at least 70% by volume of the volume of the bonded polycrystalline diamond body.

In an alternative embodiment of the present process, no protective container or cup is used, and in such embodiment the mass of solid sutectiferous silicon-rich alloy, or solid components for eutectiferous silicon-rich alloy, and mass of diamonds and silicon nitride substrate are placed directly in a pre-formed cavity of predetermined size in the pressure transmitting powder medium. The cavity can be formed in the powder by a number of techniques. For example, the pressure transmitting powder medium can be placed in a die, a solid mold of desired size can be inserted in the powder, and the resulting system pressed at embient temperature under pressure sufficient to make the powder stable in form, i.e. give the pressed powder sufficient strength so that the mold can be withdrawn therefrom leaving the cavity it has depressed therein to function as a container for the silicon nitride substrate, mass of diamonds and silicon-rich alloy. After the silicon nitride substrate, mass of diamonds and silicon-rich alloy are placed within the cavity with the mass of diamonds intermediate said substrate and said alloy, additional pressure transmitting powder is added to seal the cavity and the entire system cold-pressed at ambient temperature to dimensionally stabilize the cavity and its contents producing a substantially isostatic system of powder-enveloped cavity and contents.

Those skilled in the art will gain a further and better understanding of the present invention from the detailed description set forth below, considered in conjunction with the figures accompanying and forming a part of the specification, in which.

Figure 2:
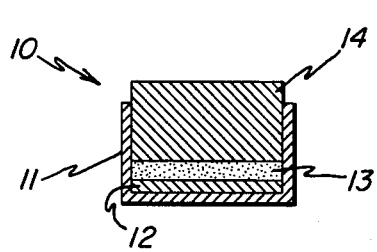
FIG. 2 is a cross-sectional view of a cell, i.e. container and contents, for carrying out infiltration of silicon-rich alloy according to this invention.
Figure 3:
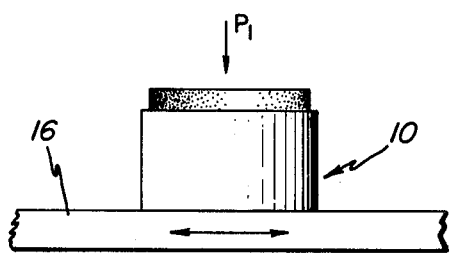
Figure 4:
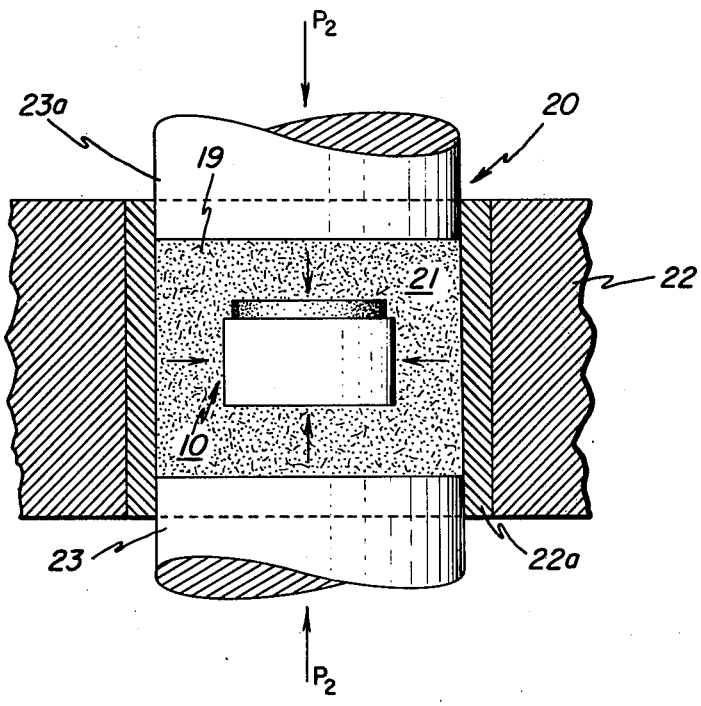
Figure 5:
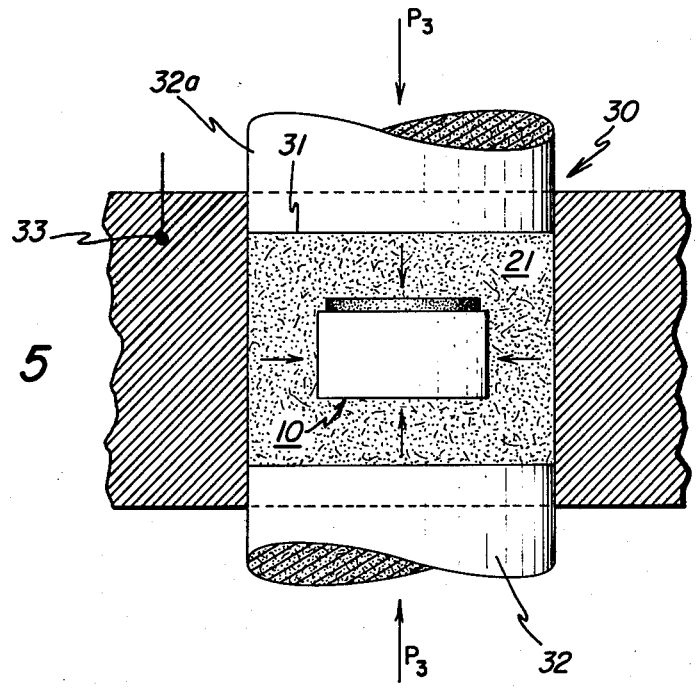
Figure 6:
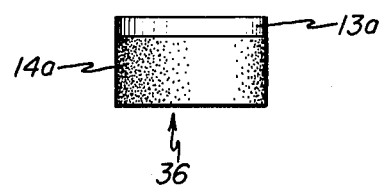
Figure 7:

FIG. 3 schematically represents apparatus for applying light pressure to the cell of FIG. 2 while the cell is being vibrated to increase the density of the mass of diamond crystals;

FIG. 4 is a sectional view through an apparatus for applying at least substantially isostatic pressure to the cell by means of a pressure transmitting powder medium to dimensionally stabilize the cell producing a substantially isostatic system;

FIG. 5 is a sectional view through a graphite mold for the simultaneous application of heat and pressure, i.e. hot-pressing, to the substantially isostatic system showing the cell enclosed therein;

FIG. 6 is an elevational view of a polycrystalline diamond body/silicon nitride substrate composite prepared according to this invention, and FIG. 7 is a photomicrograph (magnified 690×) of a polished cross-sectional surface of the composite of the present invention.

In carrying out the present process, the structure comprised of the mass of diamond crystals intermediate and in contact with a silicon nitride substrate and mass of the solid eutectiferous silicon-rich alloy is subjected to a cold-pressing step at ambient or room temperature to substantially stabilize their dimensions substantially uniformly and then to a hot-pressing step whereby the silicon alloy produces fluid silicon-rich alloy which is infiltrated throughout the mass of compressed diamond crystals, and into contact with the silicon nitride substrate.

Alternatively, the mass of diamond crystals can be in contact with at least one of the components used for forming the eutectiferous silicon-rich alloy in situ, i.e. silicon or alloying metal, and the silicon nitride substrate, mass of diamond crystals as well as the components for forming the silicon-rich alloy, are subjected to a cold-pressing step at ambient or room temperature to substantially stabilize their dimensions and then to a hot-pressing step whereby fluid eutectiferous silicon-rich alloy is produced and infiltrated throughout the mass of compressed diamond crystals and into contact with the silicon nitride substrate. The components for forming the silicon alloy are positioned to form the silicon alloy before hot-pressing is initiated, i.e. before the hot-pressing temperature is reached.

The mass of diamond crystals, mass of starting solid silicon-rich alloy, or solid components for forming the silicon-rich alloy, and silicon nitride substrate can be in a number of forms. For example, each mass can be in the form of a layer with the layer of diamond crystals intermediate the other layers. Alternatively, the starting silicon-rich alloy can be in the form of a tube or cylinder with a core extending through it, the alloy tube being cast so that it forms a close fit with the inner wall of the container, and the silicon nitride substrate can be in the form of a bar which can be centrally positioned within the core of the alloy tube, and the encircling space between the silicon alloy tube and substrate bar packed with diamond crystals.

The diamond crystals used in the present process can be natural or synthetic, i.e. man-made. They range in size in largest dimension from about 1 micron to about 1000 microns, and the particular size or sizes used depends largely on the particular packing or density of diamond crystals desired and also on the particular use of the resulting body. For most abrasive applications, for example, diamond crystals no greater than about 60 microns are preferred. Preferably, to maximize the packing of the diamond crystals in the present process, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the diamond crystals is facilitated by the jet-milling of larger diamond crystals. Preferably, the diamond crystals are chemically cleaned to remove any oxides or other impurities from the surface thereof before use in the present process. This may be accomplished by heating the diamond crystals in hydrogen at about 900° C. for about one hour.

In the present invention the starting solid eutectiferous silicon-rich alloy, i.e. the term alloy herein including intermetallic compound, is comprised of silicon and a metal, i.e. alloying metal, which forms a silicide with the silicon. Preferably, the present eutectiferous silicon-rich alloy is comprised of silicon and a metal selected from the group consisting of cobalt(Co), chromium(Cr), iron(Fe), hafnium(Hf), manganese(Mn), molybdenum(Mo), niobium(Nb), nickel(Ni), palladium(Pd), platinum(Pt), rhenium(Re), rhodium(Rh), ruthenium(Ru), tantalum(Ta), thorium(Th), titanium(Ti), uranium(U), vanadium(V), tungsten(W), yttrium(Y), zirconium(Zr) and mixtures thereof.

The present starting eutectiferous silicon-rich alloy is a solid at room temperature and contains more than 50 atomic % but less than 100 atomic % of silicon. Usually, it contains a maximum of about 99.5 atomic % silicon depending largely on the specific effect that the alloying metal has on the resulting silicon-rich alloy. The present starting solid silicon-rich alloy is eutectiferous in that it contains some eutectic structure and can be of hypoeutectic, hypereutectic or of eutectic composition. Using FIG. 1 as an example, the eutectic (2) is an alloy of specific composition which, under equilibrium conditions, on cooling freezes at constant temperature forming a solid of at least two phases, and which on heating melts completely at the same constant temperature, this constant temperature being referred to as the eutectic temperature also given at (2). The eutectic (2) is the composition at which two descending liquidus curves (3) and (4), meet at eutectic point (2), and therefore, it has a lower melting point than its neighboring hypoeutectic or hypereutectic compositions. The liquidus is a curve or line on a phase diagram representing under equilibrium conditions the temperatures at which melting ends during heating of the silicon alloy or freezing begins during cooling thereof. Specifically, the present starting solid eutectiferous silicon-rich alloy is one of the series of alloys on a eutectic horizontal (1), i.e. the horizontal passing through the eutectic point (2), and which extends from any alloy whose composition lies to the left of the eutectic (2) on an equilibrium diagram and which contains some eutectic structure, i.e. hypoeutectic, to any alloy whose composition lies to the right of the eutectic (2) on the equilibrium diagram and which contains some eutectic structure, i.e. hypereutectic alloy.

The starting solid silicon-rich alloy may or not be of the same composition as the infiltrating silicon-rich alloy. If all of the starting solid silicon-rich alloy becomes fluid at the hot-pressing temperature then it will have the same composition as the infiltrating silicon-rich alloy. However, if only a portion of the starting silicon-rich alloy, i.e. hypoeutectic or hypereutectic, becomes fluid at the hot-pressing temperature, the starting alloy does not have the same composition as the fluid infiltrating silicon-rich alloy, and in such instance the infiltrating silicon-rich alloy will be more rich in silicon than the starting hypoeutectic alloy but less rich in silicon than the starting hypereutectic silicon-rich alloy.

Figure 1:
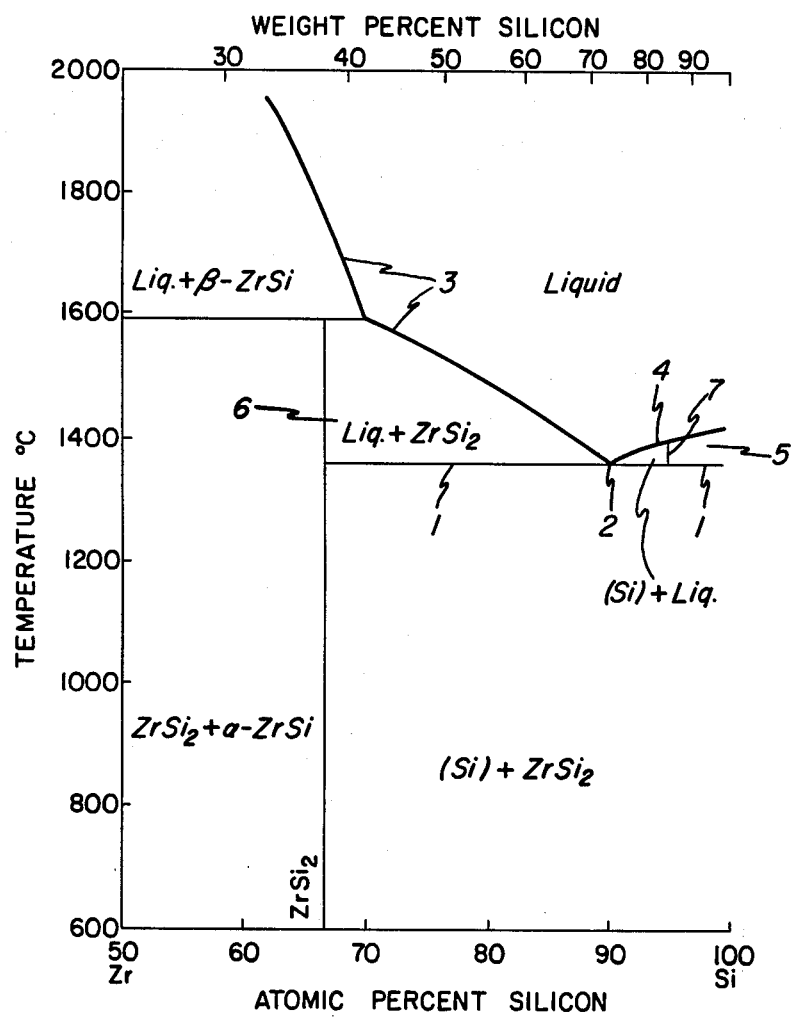
FIG. 1 is a portion of a silicon zirconium alloy phase diagram showing the equilibrium diagram for eutectiferous silicon-rich zirconium alloy useful in the present invention.

Using FIG. 1 as an example, the composition of the present infiltrating eutectiferous silicon-rich alloy and its melting temperature is found on liquidus curves (3) and (4) and includes eutectic point (2). The area (5) defined by (1), (2) and (4) is comprised of a solid phase, (Si) and a liquid phase, i.e. liquid infiltrating alloy phase, with the amount of solid phase increasing and the amount of liquid phase decreasing correspondingly as the distance to the right from eutectic point (2) along horizontal (1) is increased, i.e. as the amount of silicon in the alloy is raised from that contained in the eutectic. Likewise, the area (6) defined by (1), (2) and (3) is comprised of a solid phase $ZrSi_2$ and a liquid phase, i.e. liquid infiltrating alloy phase, with the amount of solid phase increasing and the amount of liquid phase decreasing correspondingly, as the distance to the left from eutectic point (2) along horizontal (1) is increased, i.e. as the amount of silicon in the alloy is lowered from that contained in the eutectic.

In carrying out the present process, the desired composition of the present infiltrating eutectiferous silicon-rich alloy and its melting temperature are found as a point on the liquidus curves including the eutectic point on the phase diagram for the present silicon-rich alloy, and the hot-pressing temperature is the temperature at which such desired infiltrating silicon-rich alloy composition is fluid, i.e. sufficiently flowable to infiltrate through the compressed diamond mass. When a starting solid silicon-rich alloy is used that has the same composition as that of the desired infiltrating alloy, the hot-pressing temperature is the temperature at which the alloy is fluid which ranges from about 10° C. to preferably a maximum of about 100° C. higher than the melting point of the alloy, but if desired hot-pressing temperatures higher than this preferred maximum are useful depending largely upon the particular alloy used. However, hot-pressing temperatures higher than 1600° C. are not useful since they tend to graphitize the diamonds excessively.

However, when the starting alloy does not have the same composition as that of the desired infiltrating alloy, but when it is heated to the melting point of the desired infiltrating alloy it produces such infiltrating alloy as a liquid phase, then the hot-pressing temperature is a temperature at which such infiltrating alloy phase is produced in fluid form, i.e. about 10° C. higher than the melting point of the infiltrating alloy phase.

Using FIG. 1 as an example, for a specific infiltrating alloy of hypereutectic composition, its melting point is found on liquidus line 4. For example, if the desired infiltrating hypereutectic alloy contains 95 atomic % Si, its melting point is found on liquidus line 4 to be about 1400° C. as shown by line 7. When the starting silicon-rich alloy is of the same composition as the desired infiltrating alloy as shown by line 7, all of the starting alloy would melt at the melting temperature of 1400° C., and the fluid or hot-pressing temperature would range from about 1410° C. to about preferably 1510° C., or if desired, up to but below 1600° C. However, when the starting silicon-rich alloy is any hypereutectic alloy to the right of line 7, on horizontal line 1 in the equilibrium diagram in FIG. 1, the hot-pressing temperature is the temperature at which the desired infiltrating 95 atomic % Si-5 atomic % Zr alloy is produced in fluid form which would be about 1410° C.

Also, at the hot-pressing temperature the starting alloy should produce the desired infiltrating alloy in fluid form in an amount sufficient to fill the voids of the compressed diamond mass herein having a density of crystals higher than 70% by volume and into contact with the contacting surface of the silicon nitride substrate filling pores or voids in the interface between the contacting polycrystalline body and silicon nitride substrate so that the resulting composite has an interface which is pore-free or at least substantially pore-free. As a practical matter the fluid infiltrating alloy should be produced at hot-pressing temperature in an amount of at least about 1% by volume of the starting silicon-rich alloy.

The present hot-pressing is carried out at a temperature at which the infiltrating silicon-rich alloy is fluid under a pressure which need only be sufficient at the hot-pressing temperature to break up interfacial refractory layers in the diamond mass which prevent penetration by the fluid alloy through the voids thereof and usually this requires a minimum pressure of about 500 psi. Specifically, the hot-pressing pressure can range from about 500 psi to about 20,000 psi, but usually it ranges from about 1000 psi to about 10,000 psi. Hot-pressing pressures in the present process higher than 20,000 psi provide no significant advantage.

By a temperature at which the infiltrating alloy is fluid it is meant herein a temperature at which the infiltrating alloy is readily flowable. Specifically, at its melting point given on the liquidus line, or eutectic point in the case of a eutectic alloy, the infiltrating alloy is a liquid thick viscous substance, but as its temperature is raised from its melting point, the infiltrating alloy becomes less viscous, and at a temperature about 10° C. higher than its melting point, the liquid infiltrating alloy becomes readily flowable, i.e. fluid. The temperature at which the infiltrating silicon-rich alloy is fluid is the temperature at which it will infuse or infiltrate through the capillary-size passages, interstices or voids of the present compressed mass of diamond crystals having a crystal density higher than 70% by volume. With still additional increase in temperature the flowability of the fluid infiltrating silicon-rich alloy increases resulting in a faster rate of penetration throughout the mass of diamond crystals, and at a temperature of about 100° C. higher than its melting point, the infiltrating alloy usually has its highest flowability and temperatures higher than this maximum ordinarily need not be used.

The present silicon-rich alloy of eutectic composition melts at a temperature below about 1430° C. For the preferred group of silicon-rich alloys herein, the eutectic melting point ranges from 870° C. for SiPd eutectic alloy, i.e. about 56 atomic % Si, to 1410° C. for SiMo eutectic alloy composition, i.e. about 97 atomic % Si. As shown in FIG. 1, the SiZr eutectic alloy (2) contains 90.4 atomic % Si and has a eutectic melting temperature of 1360° C. The major phase of the present solid silicon-rich eutectic alloy is almost pure silicon.

The present infiltrating eutectiferous silicon-rich alloy has a melting point below about 1500° C., usually from about 850° C. to about 1450° C., and the temperature at which it becomes fluid is at least about 10° C. higher than its melting point.

The starting solid silicon-rich alloy or solid components for producing the present silicon-rich alloy can be in the form of a continuous solid or in the form of a powder. The particular amount or volume of starting solid silicon-rich alloy used can vary depending on the amount of fluid infiltrating silicon-rich alloy it produces and the capacity of the equipment. Generally, the infiltrating silicon-rich alloy ranges in amount from about 25% by volume to about 80% by volume, but preferably for best results, it ranges from about 30% to about 60% by volume of the present compressed mass of diamond crystals having a density of crystals higher than 70% by volume.

The present hot-pressing step is carried out in an atmosphere which has no significant deleterious effect on the diamond crystals, or infiltrating silicon-rich alloy, or silicon nitride substrate. Specifically, the hot-pressing step can be carried out in a substantial vacuum or in an inert gas such as argon or helium, or it can be carried out in nitrogen or hydrogen. The present hot-pressing is carried out sufficiently rapidly so that there is no significant reaction between the infiltrating silicon-rich alloy and nitrogen or hydrogen. The hot-pressing step cannot be carried out in air because diamond graphitizes readily in air above 800°0 C. and the fluid infiltrating silicon-rich alloy would oxidize to form solid silica before any significant infusion by the fluid alloy of the diamond mass occurred.

The present silicon nitride substrate is a polycrystalline body having a density ranging from about 80% to about 100% of the theoretical density of silicon nitride. Silicon nitride density given herein is the fractional density based on the theoretical density for silicon nitride of 3.18 gm/cc. A silicon nitride polycrystalline body having a density less than about 80% is not useful because it would not have the required mechanical strength for most applications, for example for use as a tool insert. Ordinarily, the higher the density of the silicon nitride body, the higher is its mechanical strength.

In the present invention the polycrystalline silicon nitride substrate is a hot-pressed or sintered body comprised of silicon nitride, i.e., it contains silicon nitride in an amount of at least 90% by weight and usually at least 95% by weight, and generally from 96% to 99% or higher by weight, of the body. Any constituent or component of the present polycrystalline silicon nitride body other than silicon nitride should have no significant deteriorating effect on the mechanical properties of the resulting composite. Specifically, it should have no significant deteriorating effect on the properties of the silicon nitride and all other materials used in the present process in preparing the composite or on the properties of the composite itself.

Preferably, the present polycrystalline silicon nitride body can be prepared by sintering processes disclosed in copending Ser. Nos. 756,085 and 756,086 both filed on Jan. 3, 1977, in the names of Svante Prochazka et al and assigned to the assignee hereof, and by reference, are incorporated herein.

Briefly stated, Ser. No. 756,085 discloses a sintered silicon nitride body prepared by providing a homogeneous dispersion of submicron size of silicon nitride and a beryllium additive selected from the group consisting of beryllium, beryllium carbide, beryllium fluoride, beryllium nitride, beryllium silicon nitride and mixtures thereof, in an amount wherein the beryllium component is equivalent to from about 0.1% to about 2% by weight of elemental beryllium based on the amount of silicon nitride, shaping the dispersion into a green body and sintering the green body from about 1900° C. to about 2200° C. in a sintering atmosphere of nitrogen at a superatmospheric pressure which at the sintering temperatures prevents significant thermal decomposition of the silicon nitride and produces a sintered body with a density of at least about 80% of the theoretical density of silicon nitride, the minimum pressure of said nitrogen ranging from about 20 atmospheres at a sintering temperature of 1900° C. to a minimum pressure of about 130 atmospheres at a sintering temperature of 2200° C.

The process of Ser. No. 756,086 is similar to that of Ser. No. 756,085 except that a magnesium additive is included in the dispersion of silicon nitride and beryllium additive, the green body is sintered from about 1800° C. to about 2200° C. in a sintering atmosphere of nitrogen at superatmospheric pressure which ranges from a minimum of about 10 atmospheres at a sintering temperature 1800° C. to a minimum of about 130 atmospheres at a sintering temperature of 2200° C. The magnesium additive is selected from the group consisting of magnesium, magnesium carbide, magnesium nitride, magnesium cyanide, magnesium fluoride, magnesium silicide, magnesium silicon nitride and mixtures thereof. The magnesium additive is used in an amount wherein the magnesium component is equivalent to from about 0.5% by weight to about 4% by weight of elemental magnesium based on the amount of silicon nitride.

The polycrystalline body disclosed in Ser. No. 756,085 has a density ranging from about 80% to about 100% of the theoretical density of silicon nitride and is comprised of silicon nitride and beryllium ranging in amount from less than about 0.1% by weight to less than about 2.0% by weight of said silicon nitride. The polycrystalline body disclosed in Ser. No. 756,086 is similar to that disclosed in Ser. No. 756,085 except that it also contains magnesium ranging in amount from less than about 0.5% by weight to less than about 4.0% by weight of the silicon nitride.

Preferably, hot-pressed polycrystalline silicon nitride bodies can be prepared by processes disclosed in copending Ser. No. 756,083 and 756,084 both filed Jan. 3, 1977 in the names of Greskovich et al and both assigned to the assignee hereof and both, by reference, are incorporated herein.

Briefly stated, Ser. No. 756,083 discloses a hot-pressed silicon nitride body prepared by providing a homogeneous powder dispersion, submicron size, of silicon nitride and magnesium silicide in an amount ranging from about 0.5% to about 3% by weight based on the amount of silicon nitride, and hot-pressing the dispersion in an atmosphere of nitrogen from about 1600° C. to about 1850° C. under a minimum pressure of about 2000 psi. The resulting polycrystalline silicon nitride body has a density of about 80% to about 100% of the theoretical density of silicon nitride and is comprised of silicon nitride and magnesium ranging in amount from about 0.3% by weight to about 1.9% by weight of the silicon nitride.

Briefly stated, Ser. No. 756,084 discloses a hot-pressed polycrystalline silicon nitride body prepared by providing a powder dispersion of submicron size of silicon nitride and a beryllium additive selected from the group consistig of beryllium, beryllium nitride, beryllium fluoride, beryllium silicon nitride and mixtures thereof, in an amount wherein the beryllium component is equivalent to about 0.1% by weight to about 2% by weight of elemental beryllium based on the amount of silicon nitride, and hot-pressing the dispersion in an atmosphere of nitrogen from about 1600° C. to about 1850° C. under a minimum pressure of about 2000 psi. The resulting polycrystalline silicon nitride body has a density of about 80% to about 100% of the theoretical density of silicon nitride and is comprised of silicon nitride and beryllium in an amount ranging from about 0.1% by weight to about 2.0% by weight of said silicon nitride.

The thickness of the silicon nitride substrate can vary depending on the final application of the resulting composite, but it should be at least sufficiently thick to provide adequate support for the polycrystalline diamond body adhered thereto. For most applications, to provide adquate support for the adhered polycrystalline diamond body, the silicon nitride substrate is preferably at least about twice the thickness of the adhered polycrystalline diamond body.

In the arrangement shown in FIG. 2, cell 10 consists of cup 11 (right circular cylindrical wall with bottom). Within cup 11 are disposed a disc 12 of eutectiferous silicon-rich alloy, a mass 13 of diamond crystals in contact with silicon-rich alloy 12, and a thick plug 14, e.g. a cylindrical of polycrystalline silicon nitride substrate fitting closely into cup 11 and acting as a closure therefor.

Cup 11 is made of a material which is substantially inert during the hot-pressing step, i.e. a material which has no signficant deleterious effect on the properties of the present diamond body. Such a material can be a non-metal, such as compressed hexagonal boron nitride, but preferably, it is a metal, and preferably a metal selected from the group consisting of tungsten, yttrium, vanadium, tanalum and molybdenum.

No free space should be left within the plugged cup which would allow an intermixing or free movement of the contents therein so that the contents, at least substantially as initially positioned, are subjected to the substantially isostatic pressure of the cold-pressure step.

The purpose of using size-graded diamond crystals is to produce maximum packing of the diamond crystals. Alternatively, or in addition thereto, the arrangement shown in FIG. 3 is useful for increasing the density or packing of the diamond crystals. Specifically, cell 10 is placed on vibrating table 16 and held there under light pressure (about 50 psi) application during the vibration of cell 10 to promote rearrangement of the diamond crystals or particles to fill spaces and decreases void content in order to increase the density of the diamond mass to greater than 70% by volume of the diamond mass. The requisite degree of consolidation is determinable by independent testing on diamonds of the same size in a fixed dimension die.

Cell 10 is subjected to a cold-pressing step as shown in FIG. 4 which is carried out at room or ambient temperature whereby only sufficient pressure need be applied to produce a dimensionally stabilized substantially isostatic system. Specifically, cell 10 is placed in the cylindrical core of pressure mold 20 surrounded by mass 19 of very fine particles, preferably −400 mesh, and more preferably ranging in size from about 2 microns to about 20 microns of a pressure transmitting powder medium which remains substantially unsintered under the pressure and temperature conditions of the present process such as hexagonal boron nitride and silicon nitride. This pressure transmitting particulate or powder medium provides for the application of approximately or substantially isostatic pressure to cell 10, whereby cell 10 and its contents are dimensionally stabilized, i.e. densified, substantially uniformly producing a shaped substantially isostatic system of powder enveloped-cell wherein the density of the resulting compressed layer of crystals is higher than 70% by volume of the volume of compressed crystals. Pressure mold 20 (ring 22 and pistons 23, 23a) may be made of tool steel and, if desired, ring 22 may be supplied with a sintered carbide sleeve 22a as shown to permit the application of pressures as high as 200,000 psi. Pressures higher than 200,000 psi provide no significant advantage. Within the confines of piston 23, sleeve 22a and piston 23a, pressure preferably in the range of from about 20,000 psi up to about 100,000 psi, and usually up to about 50,000 psi, is exerted on the pressure transmitting powder medium by the pistons actuated in the conventional manner until the applied pressure becomes stabilized as is done in conventional powder packing technology.

Specifically, the particulr applied cold-pressing pressure used is determinable empirically and a pressure higher than that pressure which produces a dimensionally stabilized substantially isostatic system produces no significant additional densification or dimensional stabilization of cell 10 and its contents.

The nature of present pressure transmitting powder medium, such as hexagonal boron nitride and silicon nitride, is such that it results in an approximation of a hydrostatic action in response to the uniaxially applied pressure to exert substantially isostatic pressure over the entire surface of cell 10. It is assumed that the applied pressure is transmitted substantially undiminished to cell 10. The cold-pressing step diminishes the size of the voids to maximize the pressure of capillary-size voids in the diamond mass, and it also produces the required density of diamond crystals in excess of 70% by volume of the diamond mass. This reduction in void volume also reduces the ultimate content of non-diamond material in the diamond mass and provides more juxtaposed crystal-to-crystal areas properly located for effective bonding together.

After completion of the cold-pressing step, the density of the compressed diamond crystals in cell 10 should be in excess of 70% by volume of the volume of crystals. Specifically, the density of the compressed layer of mass of diamond crystals ranges from 71% to about but less than 95% by volume, and frequently from about 75% to about 90% by volume of the volume of diamond crystals. The higher the density of the crystals, the less will be the amount of non-diamond material present between the crystals resulting in a proportionately harder diamond body.

The substantially isostatic system 21 is powder-enveloped container resulting from the cold-pressing step is then subjected to a hot-pressing step whereby it is subjected to a hot-pressing temperature and pressure simultaneously.

Specifically, when the cold-pressing step is completed, either one of pistons 23, 23a is withdrawn and the resulting consolidated substantially isostatic shaped system 21 is forced out of liner 22a and into a hole of identical diameter in graphite mold 30, the transferred system 21 now being contained within the wall of hole 31 between graphite pistons 32, 32a. Graphite mold 30 is provided with thermocouple 33 to provide an indication of the temperature being applied to the dimensionally-stabilized substantially-isostatic system 21. The mold 30, with the substantially-isostatic system 21 so contained, is placed inside a conventional hot-pressing furnace (not shown). The furnace chamber is evacuated or at least substantially evacuated causing evacuation of system 21 including cell 10, providing system 21 and cell 10 with a substantial vacuum in which the hot-pressing step can be carried out. However, if desired, at this point, nitrogen, or hydrogen, or an inert gas such as argon can be fed into the furnace chamber to provide the furnace chamber as well as chamber 21 including the interior of cell 10 with a suitable hot-pressing atmosphere. While pistons 32, 32a apply a uniaxial pressure, i.e. the hot-pressing pressure, to system 21, the temperature thereof is raised to a temperature at which silicon-rich alloy disc 12 produces fluid infiltrating silicon-rich alloy.

In the hot-pressing step the hot-pressing temperature should be reached quickly and held at such temperature under the hot-pressing pressure usually for at least about one minute to insure satisfactory infiltration through the interstices of the diamond crystal mass. Generally, a hot-pressing time period ranging from about 1 minute to about 5 minutes is satisfactory. Since conversion of diamond to non-diaomond elemental carbon depends largely on time and temperature, i.e. the higher the temperature and the longer the time at such temperature the more likely the conversion to non-diamond elemental carbon, the hot-pressing step must be carried out before 5% by volume of the diamond is converted to non-diamond elemental carbon and this is determinable empirically. Conversion of 5% or more by volume of diamond to non-diamond elmental carbon is likely to result in element non-diamond carbon phase being left in the final product which would have a significantly deleterious effect on its mechanical properties.

In the hot-pressing step the application of the hot-pressing pressure to the fluid infiltrating silicon-rich alloy breaks up interfacial refractory layer or slag, largely oxide as well as carbide, which usually forms between the fluid silicon-rich alloy and diamond surfaces exposing the capillary void system to the silicon-rich alloy, after which infusion by capillary action occurs. Tests have shown that unless sufficient pressure is applied and maintained throughout hot-pressing to system 21 when the silicon-rich alloy is fluid to break up the slag, infusion of the diamond mass by the silicon-rich alloy will not occur.

During hot-pressing, as the fluid silicon-rich alloy infiltrates and flows through the diamond mass and into contact with the substrate, it encapsulates the surfaces of the compressed diamond crystals reacting with the diamond surfaces, or any non-diamond elemental carbon which may form to produce a carbide which at least in major amount and usually in substantial amount is silicon carbide. During hot-pressing, the infiltrating alloy also fills the interface between the contacting surfaces of the polycrystalline diamond body and substrate resulting in the production of a strong adherent bond in situ. The resulting product is an integral well-bonded composite. The infiltrating alloy may also penetrate or diffuse into the silicon nitride substrate.

It is during this hot-pressing step that it is particularly important that substantially isostatic conditions be maintained so that when the silicon-rich alloy is converted to the fluid state, this fluid will not be able to pass between mass 13 and cup 11 and escape to any significant extent, but will be forced to move throughout the mass 13 of diamond crystals.

When the hot-pressing step is completed, at least sufficient pressure should be maintained during cooling of the hot-pressed system 21 so that hot-pressed cell 10 is subjected to substantially isostatic pressure sufficient to preserve its dimensional stability. Preferably, hot-pressed system 21 is allowed to cool to room temperature. Hot-pressed cell 10 is then removed from the system, and the present composite 36 is recovered comprised of polycrystalline diamond body 13a bonded in situ directly to substrate 14a. Adherent metal, if any, from the protective container and any squeezed out excess silicon alloy at the outside surfaces of the composite can be removed by conventional techniques such as grinding.

When the present process is carried out with the components in the form of layers, coextensive with each other, the resulting composite can be in a number of forms such as a disc, square or rectangle, rod or bar and can have a flat face of bonded diamonds.

When the present process is carried out with the silicon-rich alloy in the form of a tube or a cylinder with a core or hole extending through it and the silicon nitride substrate is in the form of a bar centrally positioned within the core of the tube and the encircling space between the silicon alloy tube and substrate bar packed with diamond crystals, the resulting composite is in the form of a circular bar.

The present composite is comprised of a polycrystalline diamond body integrally bonded to a substrate of a polycrystalline silicon nitride body by a bond formed in situ.

The adhered polycrystalline diamond body of the present composite is comprised of diamond crystals adherently bonded to each other by a silicon atom-containing bonding medium, said diamond crystals ranging in size from about 1 micron to about 1000 microns, the density of said diamond crystals ranging from at least about 70% by volume up to about but less than 90% by volume and frequently about 89% by volume of said polycrystalline diamond body, said silicon atom-containing bonding medium being present in said diamond body in an amount ranging up to about 30% by volume of said diamond body, said bonding medium being distributed at least substantially uniformly throughout the polycrystalline diamond body, the portion or surface of said bonding medium in contact with the surfaces of the bonding diamonds being at least in major amount silicon carbide, i.e. more than 50% by volume of the portion or surface of the bonding medium in direct contact with the surfaces of the diamond crystals is silicon carbide. Preferably, the portion or surface of said bonding medium in contact with the surfaces of the bonded diamond is silicon carbide at least in substantial amount, i.e. at least about 85% by volume and preferably 100% by volume of the bonding medium in direct contact with the surfaces of the bonded diamond crystals is silicon carbide. The diamond body of the present composite is pore-free or at least substantially pore-free.

In the composite, the polycrystalline silicon nitride substrate ranges in density from about 80% to about 100% of the theoretical density of silicon nitride and contains silicon nitride in an amount of at least 90% by weight of said body and is free of constituents which have a significantly deleterious effect on the mechanical properties of said composite.

In the present composite, at the interface between the polycrystalline diamond body and silicon nitride substrate, the bonding medium extends from the polycrystalline diamond body into contact with the silicon nitride substrate at least substantially filling any pores throughout the interface so that the interface is pore-free or at least substantially pore-free, i.e. it may contain voids or pores in an amount less than 1% by volume of the total volume of the interface providing such voids or pores as small, less than 0.5 micron, and sufficiently uniformly distributed throughout the interface so that they have no significant deleterious effect on the adherent bond at such interface. The void or pore content at the interface is determinable by standard metallographic techniques such as, for example, optically examining a cross-section of the composite. Generally, the distribution and thickness of the bonding medium throughout the interface is substantially the same as the distribution and thickness of the bonding medium throughout the polycrystalline diamond body of the composite. Ordinarily, on the basis of a polished cross-section of the composite, the average thickness of the bonding medium at the interface would be substantially the same as the average thickness of bonding medium between the contacting diamond crystals of the polycrystalline diamond body of the composite. Also, on the basis of a polished cross-section of the composite, the maximum thickness of bonding medium at the interface would be substantially equivalent to the thickness of bonding medium between the largest contacting diamond crystals of the polycrystalline diamond body of the composite. Alternatively, the maximum thickness of bonding medium at the interface can be defined as about 50% of the largest size diamond crystals in the polycrystalline diamond body measured along their longest edge dimension. The silicon nitride substrate may also contain bonding medium produced by the penetration or diffusion therein by the infiltrating alloy during hot-pressing.

The present silicon atom-containing bonding medium always contains silicon carbide. In one embodiment, the present bonding medium is comprised of silicon carbide and metal silicide. In another embodiment, the present bonding medium is comprised of silicon carbide, metal silicide and elemental silicon. In yet another embodiment, the present bonding medium is comprised of silicon carbide, metal silicide and metal carbide. In yet another embodiment, the present bonding medium is comprised of silicon carbide, metal silicide, metal carbide and elemental silicon. In still another embodiment, the present bonding medium is comprised of silicon carbide, metal carbide and elemental silicon. The metal components of the metal silicide and metal carbide in the present bonding medium are produced by the alloying metal or metals present in the infiltrating alloy.

The metal component of the metal silicide present in the bonding medium is preferably selected from the group consisting of cobalt, chromium, iron, hafnium, manganese, rhenium, rhodium, ruthenium, tantalum, thorium, titanium, uranium, vanadium, tungsten, yttrium, zirconium and alloys thereof.

The metal component of the metal carbide present in the bonding medium is a strong carbide former which forms a stable carbide and is preferably selected from the group consisting of chromium, hafnium, titanium, zirconium, tantalum, vanadium, tungsten, molybdenum and alloys thereof.

The amount of elemental silicon, if any, and silicon carbide in the bonding medium of the adhered polycrystalline diamond body can vary depending on the extent of the reaction between the surfaces of the diamond crystals and the infiltrating silicon-rich alloy as well as the reaction between non-diamond elemental carbon and infiltrating silicon-rich alloy. Assuming all other factors are equal, the particular amount of silicon carbide present in the bonding medium in the adherent polycrystalline diamond body depends largely on the particular hot-pressing temperature used and the time period at such temperature. Specifically, with increasing time and/or temperature, the amount of silicon carbide increases while the amount of elemental silicon decreases or is reduced to a non-detectable amount. The production of the present body of bonded diamond crystals with a particular desired amount of silicon carbide to attain certain desirable properties, for example, is determinable empirically.

Specifically, the bonding medium in the adhered polycrystalline diamond body will always contain at least a detectable amount of silicon carbide and at least a detectable amount of a silicide and/or carbide of the alloying metal present in the infiltrating alloy. The metal silicide is usually in the form of a disilicide depending upon the particular infiltrating alloy used. The bonding medium may also contain at least a detectable amount of elemental silicon. By a detectable amount of silicon carbide, metal silicide, metal carbide or elemental silicon it is meant herein an amount detectable by selective area diffraction analysis of transmission electron microscopy on a thin section of the present body. Generally, however, the present bonding medium in the diamond body contains silicon carbide in an amount ranging from about 1% by volume to about 25% by volume of the present polycrystalline diamond body and usually metal silicide in at least a detectable amount, and frequently in a minimum amount of about 0.1% by volume of the polycrystalline diamond body. The particular amount of metal silicide present depends largely on the composition of the infiltrating silicon-rich alloy. The metal silicides are hard and also frequently have lower linear thermal expansion coefficients than the metals, or in some instances lower than diamond, as for example rhenium, a desirable property for a phase in a polycrystalline diamond body. The particular amount of silicon carbide and elemental silicon present depends largely on the composition of the infiltrating silicon-rich alloy as well as on the extent of the reaction between the infiltrating silicon-rich alloy and diamond or non-diamond carbon. The particular amount of metal carbide present depends largely on the composition of the infiltrating silicon-rich alloy.

Selective area diffraction analysis of transmission electron microscopy on a thin section of the present composite also will show that the portion of the bonding medium in contact with the surfaces of the bonded diamonds is at least in major amount silicon carbide.

The present adhered body of bonded diamond crystals is void or pore-free or at least substantially pore-free, i.e. it may contain voids or pores in an amount less than 1% by volume of the body providing such voids or pores are small, less than 0.5 micron, and sufficiently uniformly distributed throughout the diamond body so that they have no significant deleterious effect on its mechanical properties. The void or pore content of the present diamond body is determinable by standard metallographic techniques such as, for example, optically examining a polished cross-section of the body.

The present adhered diamond body also is free of non-diamond carbon phase in that it does not contain non-diamond elemental carbon phase in an amount detectable by X-ray diffraction analysis.

One particular advantage of the present invention is that the polycrystalline diamond body of the present composite can be produced in a wide range of sizes and shapes. For example, the adhered diamond body can be as wide or as long as one inch or longer. Polycrystalline diamond bodies one inch in length or longer and having the present diamond density are not producible as a practical matter, or are not producible at all, by techniques utilizing the ultra high pressures and temperatures of the diamond stable region due to the limitations of the equipment necessary to sustain the severe pressure-temperature requirements for the necessary period of time, i.e. the equipment is so complex and massive that its capacity is limited. On the other hand, the present adhered polycrystalline diamond body can be as small or as thin as desired, however, it will always be in excess of a monolayer of diamond crystals.

The present composite is highly useful as an abrasive, cutting tool, nozzle or other wear-resistant part.

The invention is further illustrated by the following examples where, unless otherwise stated, the procedure was as follows:

Hexagonal boron nitride powder of fine particle size, e.g. ranging in size from about 2 microns to about 20 microns, was used as the pressure transmitting medium.

The polycrystalline silicon nitride substrate was in the form of a disc which in Examples 2 and 3 had a thickness of about 125 mils and in Examples 5 and 6 had a thickness of about 100 mils. It was a commercially available hot-pressed material with a density higher than 99%, i.e. it was almost 100% dense, and was comprised, by weight of the silicon nitride hot-pressed body, of ½% MgO, about ½% Fe, about 1/200% metallic impurities such as Ca, Al and Cr, 2% free Si, 1% SiC with the remainder being silicon nitride.

The equipment used was substantially the same as that shown in FIGS. 4 and 5.

Cold-pressing of the charge was carried out at room temperature as shown in FIG. 4 to about 80,000 psi, and in the resulting pressed assembly, the density of the diamond crystals was higher than 75% by volume of the compressed diamond mass.

The amount of infiltrating alloy was sufficient to completely infiltrate through the compressed diamond mass and to contact the contacting surface of the substrate and fill the pores of the interface.

The infiltrating alloy was a eutectiferous silicon-rich alloy.

Density given herein of the polycrystalline silicon nitride body used as a substrate is the fractional density based on the theoretical density of the silicon nitride of 3.18 gm/cc.

Fracturing of a composite or a polycrystalline diamond body was carried out with a hammer and wedge.

Optical examination was under a microscope magnified about 100 X.

Polishing was carried out on a cast iron scaife.

Where a particular diamond density is given as percent by volume of the polycrystalline diamond body, it was determined by the standard point count technique using a photomicrograph of a polished surface magnified 690 times and the surface area analyzed was sufficiently large to represent the microstructure of the entire body.

Where the diamond density is given as a range greater than 70% by volume but less than 90% by volume of the polycrystalline diamond body, this range is based on experience, results with similar runs, particularly runs where the polycrystalline diamond body alone was prepared, and the appearance of the adhered polycrystalline body as a whole, and also, the volume of the recovered cleaned polycrystalline diamond body portion of the composite as compared to the volume of the starting diamond powder on the assumption that less than 5% by volume of the diamond powder had converted to non-diamond elemental carbon phase.

In examples 1 and 2, the infiltrating silicon-rich alloy was an alloy of silicon and zirconium formed in situ.

EXAMPLE 1

In this example a polycrystalline diamond body was prepared without a substrate.

A cast silicon disc weighing 330 mg was placed within a zirconium sleeve in a molybdenum cup. About 500 mg of fine diamond powder, particle size ranging from 1 micron to about 60 microns with at least 40 weight % of the diamond powder being smaller than 10 microns was packed on top of the silicon disc. A molybdenum cup slightly larger in diameter than the original cup, i.e. the cup containing silicon and diamonds, was placed over the opening of the original cup as a cover.

The resulting container was than packed in hexagonal boron nitride powder as shown in FIG. 4 and the whole charge was pressed at room temperature, i.e. cold-pressed, in a steel die to about 80,000 psi subjecting the container and its contents to substantially isostatic pressure until the pressure became stabilized producing a dimensionally stabilized shaped substantially isostatic system of powder-enveloped container. From previous experiments it was known that in the resulting pressed assembly, i.e. in the resulting shaped substantially isostatic system of powder-enveloped container, the density of diamond crystals was higher than 75% by volume of the compressed diamond mass. Also, the amount of silicon present was about 80% by volume of the compressed diamond mass.

The resulting pressed assembly 21 of powder-enveloped container was then hot-pressed, i.e. it was pushed into a graphite mold of the same diameter size as the steel die, as shown in FIG. 5, which was placed within an induction heater. The interior of the container was evacuated and a nitrogen atmosphere introduced therein by evacuating the heater to about 10 torr before back filling it with nitrogen. A pressure of about 5000 psi was applied to the pressed assembly 21 and maintained thereon by the graphite die which was then heated to a temperature of 1500° C. in about 7 minutes by the induction heater. As the assembly was heated, the pressure also went up to about 10,000 psi due to the expansion of the system. When the temperature reached about 1350° C. the piston 23a dropped and the pressure dropped to about 5000 psi indicating that silicon-rich zirconium alloy had formed, become fluid and had proceeded to infiltrate through the compressed diamond mass. The pressure was raised to the maximum hot-pressing pressure of 10,000 psi and when the temperature reached 1500° C., the assembly was maintained at the maximum hot-pressing temperature of 1500° C. under 10,000 psi for 1 minute to insure complete infiltration by the alloy of the smaller capillaries of the compressed diamond mass. The power supply was then turned off but no additional pressure was applied. This provided a firm pressure at high temperature but reduced pressure at low temperature providing adequate geometric stability, i.e. this maintained the dimensions of the hot-pressed assembly until it was sufficiently cool for handling.

The resulting polycrystalline diamond body was recovered by grinding and grit blasting away can metal, i.e. molybdenum cup and zirconium sleeve, and excess silicon at the outside surface and faces of the body.

The resulting integral polycrystalline diamond body had the shape of a disc about 0.115 inch thick. It appeared to be well-infiltrated and bonded.

X-ray diffraction analysis of the cleaned face through which the alloy entered showed it to be comprised of diamond, silicon carbide and elemental silicon, indicating that the silicon carbide and elemental silicon were present in an amount of at least 2% by volume of the body. However, the X-ray diffraction analysis did not detect non-diamond elemental carbon phase.

Examination of the fractured cross-sectional surfaces of the disc showed that the fracture was transgranular rather than intergranular, i.e., it had fractured through the diamond grains rather than along grain boundaries. This indicates that the bonding medium was highly adherent and was as strong as the diamond grains or crystals themselves.

Examination of the fractured surfaces showed them to be pore-free and the bonding medium was uniformly distributed throughout the body.

Examination of the polished cross-sectional surface showed no strings of holes formed from diamond fragment pullout illustrating the strong bonding therein and its usefulness as an abrasive.

The density of the diamond crystals was about 81% by volume of the polycrystalline diamond body.

A photomicrograph of the polished surface, magnified 690 times, showed a white phase. X-ray spectral analysis of this phase showed that it consisted of zirconium and silicon indicating that this phase was zirconium silicide.

EXAMPLE 2

In this example, the composite was prepared using hot-pressed polycrystalline silicon nitride as a substrate.

A cast silicon disc weighing 142 mg was placed within a zirconium sleeve in a zirconium cup. 270 mg of diamond powder wherein 85 weight % of the diamond ranged in size from 53 microns to 62 microns and 15 weight % was about 5 microns in size was packed on the silicon disc producing an approximate powder thickness of 0.060 inch. Instead of the metal can cover used in Example 1, hot-pressed polycrystalline silicon nitride was used as a plug, i.e. plug 14, as shown in FIG. 2.

The resulting plugged cup was than packed in hexagonal boron nitride powder as shown in FIG. 4 and the whole charge was cold-pressed at room temperature in the same manner disclosed in Example 1 subjecting the plugged cup and its contents to substantially isostatic pressure until the pressure became stabilized producing a dimensionally stabilized shaped substantially isostatic system of powder-enveloped plugged cup. From previous experiments it was known that in the resulting pressed assembly, i.e. in the resulting shaped substantially isostatic system of powder-enveloped plugged cup, the density of diamond crystals was higher than 75% by volume of the compressed diamond mass. The resulting pressed assembly 21 of powder-enveloped plugged cup was then hot-pressed in the same manner disclosed in Example 1 except as given in Table I.

The resulting composite was recovered by grinding and grit blasting away can metal and excess silicon at the outside surface and faces of the composite.

Examples 1 and 2 are shown in Table I. Also, in Table I, in Examples 3, 5 and 6 a cast alloy in the form of a disc of the given composition and thickness and having essentially the same diameter as the given liner was placed within the liner at the bottom of the given cup. The diamond powder in the given amount was packed on top of the disc. Finally, the given polycrystalline silicon nitride substrate was placed on top of the diamond powder forming a plug in the cup as shown by 14 in FIG. 2. The resulting plugged cup was then cold-pressed and hot-pressed in the same manner disclosed in Example 2 except as given in Table I. The resulting composite was recovered substantially in the same manner disclosed in Example 2.

The resulting cleaned integral composite bodies of Examples 2, 3, 5 and 6 had the shape of a substantially uniform disc which in Examples 2 and 3 had a thickness of approximately 0.185 inch, and in Examples 5 and 6 of approximately 0.150 inch.

In Example 4, a polycrystalline diamond body was produced and no metallic container, liner or substrate was used but the equipment used was substantially the same as that set forth in FIGS. 4 and 5. Specifically, to carry out Example 4, the hexagonal boron nitride powder was packed into the die of FIG. 4 and a cylinder used as a mold was pressed into the powder. The cylinder was made of cemented metal carbide and was about 0.35 inch in diameter and 0.25 inch in thickness. The axis of the cylinder was approximately lined up with the central axis of the die.

After the cylinder was inserted in the powder, additional hexagonal boron nitride powder was placed in the die covering the cylinder completely, and the resulting powder-enveloped cylinder was pressed at room temperatures under a pressure of 50,000 psi. Piston 23a was then withdrawn and piston 23 was used to push the resulting pressed powder-enveloped cylinder partially out of the die.

The exposed portion of the pressed powder was removed leaving the cylinder partially exposed. The cylinder was then withdrawn leaving the cavity it had impressed therein. In Example 4, a cast alloy disc of the given composition and thickness having a diameter essentially the same as the inner diameter of the cavity was placed in the bottom of the cavity. A layer of diamond powder of the given size, amount and thickness was packed on top of the alloy disc.

A disc of hot-pressed hexagonal boron nitride powder of about the same diameter as the inner diameter of the cavity was placed within the cavity on top of the diamond powder as a plug to insure that the surface of the resulting polycrystalline diamond body would be flat.

The entire mass was then pushed into the center of the die by piston 23a which was then withdrawn. An additional amount of hexagonal boron nitride powder was added to the die to cover the hot-pressed disc of hexagonal boron nitride resulting in the cavity and contents being enveloped by hexagonal boron nitride as illustrated by FIG. 4. The resulting charge was then pressed at room temperature, i.e. cold-pressed, in the steel die under a pressure of 80,000 psi as shown in FIG. 4 subjecting the cavity and its contents to substantially isostatic pressure until the pressure became stabilized producing a dimensionally stabilized shaped substantially isostatic system of powder-enveloped cavity and contents. From previous experiments it was known that in the resulting shaped substantially isostatic system of powder-enveloped cavity and contents, the density of the diamond crystals was higher than 75% by volume of the compressed diamond mass.

The resulting pressed assembly of powder-enveloped cavity and contents, which was substantially the same as 21 except that no metal container was used, was then hot-pressed, i.e. it was pushed into a graphite mold of the same diameter size as the steel die, as shown in FIG. 5, and placed within an induction heater. The interior of the cavity was evacuated and a nitrogen atmosphere introduced therein by evacuating the heater to about 10 torr before back filling it with flowing dry nitrogen. A pressure of about 5000 psi was applied to the pressed assembly and maintained thereon by the graphite die, which was then heated by the induction heater at a rate which reached the given maximum hot-pressing temperature in about 5 to 7 minutes. As the assembly was heated, the pressure increased to the given maximum hot-pressure due to the expansion of the entire system.

At the given temperature at which infiltration begins or proceeds the piston and the pressure dropped to about 5000 psi indicating that the given alloy had melted and become fluid and had infiltrated through the diamond mass. The pressure was then raised back to the given maximum hot-pressing pressure where it was maintained at the given maximum hot-pressing temperature for one minute to insure complete infiltration by the alloy of the smaller capillaries of the compressed diamond mass. The power supply was then turned off but no additional pressure was applied. This provided a firm pressure at high temperature but reduced pressure at lower temperature providing adequate geometric stability. At room temperature, the resulting polycrystalline diamond body was recovered. The plug did not bond to the diamond body. After removing surface scales of hexagonal boron nitride powder and excess alloy by grinding and grit blasting the resulting integral polycrystalline diamond body had the shape of a disc with the given thickness.

In Table I the hot-pressing temperature at which infiltration begins is that temperature at which the alloy is fluid and proceeds to infiltrate through the compressed diamond mass. The given maximum hot-pressing temperature and maximum hot-pressing pressure were maintained simultaneously for one minute to insure complete infiltration of the smaller capillaries of the compressed diamond crystal mass.

TABLE I

| Ex. | Infiltrating Alloy Atomic % | Amt. (mg) | Thickness Approx. (in) | Diamond Powder Size (micron) | Amt. (mg) | Approx. Pwdr. Thickness (in.) | Metal Container (if any) | Pressing Substrate or plug | Max. Hot-Pressing Pressure Approx. (psi) | Hot Pressing Temp. Infiltration (°C.) | Temp. of Infiltration Maximum Temp. °C. | Melting Point Alloy in Literature °C. | Polycrystalline Diamond Body Approx. Thickness (inch) | x-ray Analysis of Diamond Body |
|---|---|---|---|---|---|---|---|---|---|---|---|---|---|---|
| 1 | cast silicon | 330 | | 1μ–60μ where-in about 40w/o was smaller than 10μ | 500 | | Mo-cup with Zr-liner | none- used as cover | 10,000 | 1350 | 1500 | 1360 (Si-9.6w/o Zr eutectic) | .115 | (of cleaned face) diamond, SiC and Si |
| 2 | cast silicon | 142 | .030 | 82w/o of 53μ–62μ, 15 w/o of ~5μ | 270 | .060 | Zr-cup with Zr-liner | hot-pressed silicon nitride | 13,000 | ~1300 | 1525 | 1360 (Si-9.6A/o Zr eutectic) | .060 | |
| 3 | 85 A/o Si 15 A/o Cr | 260 | .040 | Same as Ex. 1 | 290 | .063 | Mo-cup with Zr-liner | hot-pressed silicon nitride | 11,000 | 1260 | 1450 | 1335 (SiCr binary) | .055 | |
| 4 | 86 A/o Si 14 A/o Ti | 210 | .040 | Same as Ex. 1 | 250 | .055 | None | hot-pressed hexagonal boron nitride powder | 13,000 | 1345 | 1540 | 1330 | .060 | (of crushed body) diamond, SiC and TiSi$_2$ |
| 5 | 86 A/o Si 14 A/o Ti | 133 | ~.030 | Same as Ex. 1 | 227 | | Mo-cup with Mo-liner | hot-pressed silicon nitride | 13,000 | 1322 | 1525 | 1330 | .050 | |
| 6 | 95 A/o Si 5 A/o Re | 121 | | 70w/o of 1μ–60μ where-in up to 17w/o was 1μ~10μ and 30w/o of 1μ–~5μ | 200 | | Mo-cup with Mo-liner | hot-pressed silicon nitride | 13,000 | 1340 | 1540 | 1250 (predicted) | .045 | |

Examples 2, 3, 5 and 6 illustrate the production of the present composite. In Examples 2, 3, 5 and 6, on optical examination, each composite appeared to be a continuous structure, but the boundary between the diamond body and substrate could be detected by the difference in grain size as well as the difference in color between the diamond body and substrate, i.e. the silicon nitride substrate being darker in color than the grey diamond body. The external surface of each adhered polycrystalline diamond body appeared to be well-infiltrated with bonding medium which appeared to be uniformly distributed. The diamonds appeared to be well-bonded to each other.

The adhered polycrystalline diamond body of the composites of Examples 3 and 4 had a diamond density higher than 70% by volume but less than 90% by volume of the volume of the polycrystalline body.

The diamond face of the composite of Example 2 was polished and optical examination of the polished face showed no strings of holes formed from diamond fragment pullout illustrating the strong bonding therein. The density of the diamond crystals was about 71% by volume of the adhered polycrystalline diamond body of Example 2.

In Example 4, the polycrystalline diamond body was a well-infiltrated, well-bonded hard disc. The diamond body was fractured substantially in half. Optical examination of the fractured cross-sectional surfaces showed them to be pore-free, that the bonding medium was uniformly distributed throughout the body, and that the fracture was transgranular rather than intergranular, i.e. it had fractured through the diamond grains rather than along the grain boundaries. This indicates that the bonding medium was highly adherent and was as strong as the diamond grains or crystals themselves.

A fractured surface of the disc of Example 4 was polished and examination of the polished surface showed no strings of holes formed from diamond fragment pullout illustrating the strong bonding therein. In Example 4 the density of the diamond crystals was about 80% by volume of the polycrystalline diamond body.

EXAMPLE 7

The composite produced in Example 3 was evaluated as a cutting tool. The exposed surface of the polycrystalline diamond body of the composite was ground with a diamond grinding wheel to smooth it out and produce a sharp cutting edge. The substrate of the composite was then clamped in a tool holder.

A portion of the cutting edge was evaluated on a lathe turning of Jackfork Sandstone with a feed per revolution of 0.005 inch and a depth of cut of 0.020 inch.

At a cutting speed of 94 surface feet per minute, the wear rate was determined to be 0.22 cubic inch per minute X $10^{-6}$. Another portion of the cutting edge was evaluated at a cutting speed of 260 surface feet per minute and was found to have a wear of 0.501 cubic inch per minute X $10^{-6}$.

The composite was removed from the tool holder and examination of the interface between the diamond body and substrate showed that it had not been affected by these machining tests.

EXAMPLE 8

The procedure used in this example was the same as that set forth in Example 7, except that the composite produced in Example 5 was used.

A portion of the cutting edge at a cutting speed of 100 surface feet per minute after two minutes of cutting time generated very small wear scar indicating excellent wear resistance, but the Jackfork Sandstone had a deep recess and since the composite was brittle, a small piece of the cutting edge broke.

Examination of the composite after the cutting showed that the interface between the polycrystalline diamond body and silicon nitride substrate was not affected by these cutting tests.

EXAMPLE 9

The composite produced in Example 6 was fractured substantially in half, and the fractured cross-sectional surfaces were examined optically. Examination of the fractured surfaces showed that the polycrystalline diamond body as well as the interface of the composite were pore-free, that the bonding medium was distributed uniformly throughout the diamond body and that the fracture was transgranular rather than intergranular, i.e. that the fracture occurred through the diamond grains rather than along the grain boundaries. This indicates that the bonding medium was highly adherent and was a strong as the diamond grains or crystals themselves. Also, no visible interlayer or defects at the interface between the silicon nitride substrate and the adhered polycrystalline diamond layer could be detected. The fractured surface of the composite appeared to have a continuous structure. However, the difference in grain size between the diamonds and the strongly adhered substrate as well as the darker color of the substrate, enabled recognition of the boundary between the substrate and adhered polycrystalline diamond body.

The fractured cross-section of the composite was polished. Optical examination of the polished cross-sectional surface, which is shown in FIG 7, showed no strings of holes formed from diamond fragment pullout illustrating the strong bonding therein. The polycrystalline diamond body is shown in the upper portion and the substrate in the lower portion of FIG. 7, and the interface therebetween can be distinguished by the difference in crystal structure and color between the diamond body and the substrate. The density of the diamond crystals was about 75% by volume of the polycrystalline diamond body in FIG. 7.

EXAMPLE 10

The composites produced in Examples 2, 3 and 5 were fractured substantially in half, and the fractured cross-sectional surfaces were examined optically. Examination of the fractured surfaces showed that the polycrystalline diamond body as well as the interface of each composite were pore-free, that the bonding medium was distributed uniformly throughout the diamond body and that the fractures were transgranular rather than intergranular, i.e. the fractures occurred through the diamond grains rather than along grain boundaries. This indicates that the bonding medium was highly adherent and was as strong as the diamond grains or crystals themselves. Also, no visible interlayer or defects at the interface between the silicon nitride substrate and the adhered polycrystalline diamond layer could be detected. The fractured surface of each composite appeared to have a continuous structure. However, the difference in grain size between the diamonds and the strongly adhered substrate as well as the darker color of the substrate enabled recognition of the boundary between the substrate and adhered polycrystalline diamond body.

The fractured cross-section of the composite of Example 5 was polished. Examination of the polished cross-sectional surface showed no strings of holes formed from diamond fragment pullout illustrating the strong bonding therein. A photomicrograph taken of the polished surface magnified 690 X indicated an interlayer of bonding medium through the interface. A scanning electron micrograph of the polished surface magnified 1000 X showed an interlayer of bonding medium through the interface which had a maximum thickness of about 3 microns.

X-ray spectral analysis of the bonding medium in the interlayer and in the polycrystalline diamond body showed that the components in each were the same.

The following patent and copending applications assigned to the assignee hereof, are incorporated herein by reference:

U.S. Pat. No. 3,982,911 to Lee discloses a process of preparing a composite cubic boron nitride abrasive body by disposing cubic boron nitride crystals together with a substrate and bonding alloy in a protective metal container, placing the container within a pressure transmitting powder medium, applying substantially isostatic pressure to the container and its contents via the powder medium, and hot-pressing the resulting powder-enveloped container.

Ser. No. 787,858 filed Apr. 15, 1977 now U.S. Pat. No. 4,110,084 in the names of Lee et al discloses a process of preparing a cubic boron nitride abrasive composite by disposing cubic boron nitride crystals, aluminum or aluminum alloy and a silicon carbide ceramic substrate in a container, placing the container within a pressure transmitting powder medium, applying substantially isostatic pressure to the container and its contents via the powder medium, and hot-pressing the resulting powder-enveloped container.

Ser. No. 844,448, now U.S. Pat. No. 4,124,401, filed of even data herewith in the names of Lee et al discloses a polycrystalline diamond body formed by subjecting a mass of diamond crystals in contact with a mass of silicon-rich eutectiferous alloy to substantially isostatic pressure to dimensionally stabilize them, and hot-pressing the resulting system to infiltrate the alloy through the diamond mass.

Ser. No. 844,447 filed of even data herewith in the names of Lee et al relates to the production of a composite of a polycrystalline diamond body and silicon carbide substrate by subjecting a mass of diamond crystals in contact with a mass of eutectiferous silicon-rich alloy and a silicon carbide substrate to substantially isostatic pressure to dimensionally stabilize them, and hot-pressing the resulting system to infiltrate the alloy through the diamond mass and into contact with the substrate.

Ser. No. 844,446, now abandoned, filed of even date herewith in the names of Lee et al discloses a polycrystalline diamond body formed by subjecting a mass of diamond crystals in contact with a mass of silicon to substantially isostatic pressure to dimensionally stabilize them, and hot-pressing the resulting system to infiltrate the alloy through the diamond mass.

What is claimed is:

1. A process for preparing an integral composite of a polycrystalline diamond body and silicon nitride substrate at pressures substantially below those required by the diamond stable region which includes a hot-pressing step and which comprises:

(a) placing within a protective container or cup a mass of solid eutectiferous silicon-rich alloy, or solid components for providing eutectiferous silicon-rich alloy, a mass of diamond crystals and a polycrystalline silicon nitride substrate, said mass of diamond crystals being intermediate and in contact with said substrate and said mass of solid eutectiferous silicon-rich alloy, or with at least one of said components for providing eutectiferous silicon-rich alloy, said eutectiferous silicon-rich alloy being composed of silicon and a metal which forms a silicide with said silicon and which is selected from the group consisting of cobalt, chromium, iron, hafnium, manganese, molybdenum, nickel, palladium, platinum, rhenium, rhodium, ruthenium, tantalum, thorium, titanium, uranium, vanadium, tungsten, yttrium, zirconium, and alloys thereof;

(b) disposing said container and its contents within a pressure transmitting powder medium that transmits applied pressure substantially undiminished and remains substantially unsintered during said hot-pressing;

(c) applying sufficient substantially isostatic pressure to said container and its contents via said powder medium to substantially stabilize the dimensions of said container and said contents substantially uniformly producing a shaped substantially isostatic system of powder-enveloped container wherein the density of the resulting compressed mass of diamond crystals is higher than 70% by volume of the volume of said compressed diamond crystals;

(d) hot pressing the resulting substantially isostatic system producing fluid infiltrating eutectiferous silicon-rich alloy and infiltrating said fluid eutectiferous silicon-rich alloy through the interstices of said compressed mass of diamond crystals and into contact with the contacting surface of said substrate which forms an interface with said compressed mass of crystals, said hot-pressing being carried out at an hot-pressing temperature below 1600° C. under a hot-pressing pressure sufficient to infiltrate said fluid silicon-rich alloy throughout the interstices of said compressed mass of diamond crystals, said solid eutectiferous silicon-rich alloy, or solid components for eutectiferous silicon-rich alloy being used in an amount sufficient to produce sufficient fluid eutectiferous silicon-rich alloy at said hot-pressing temperature to fill the interstices of said compressed mass of diamond crystals and contact the contacting surface of said substrate filling the pores through the interface so that it is at least substantially pore-free, said hot-pressing being carried out in an atmosphere which has no significant deleterious effect on said diamond crystals or said infiltrating fluid silicon-rich alloy or on said silicon nitride substrate, said hot-pressing converting less than 5% by volume of said diamond crystals to non-diamond elemental carbon, said infiltrating silicon-rich alloy encapsulating the surfaces of the compressed diamond crystals reacting with the diamond surfaces or non-diamond elemental carbon producing a carbide which at least in major amount is silicon carbide;

(e) maintaining sufficient pressure on the resulting hot-pressed substantially isostatic system during cooling thereof to at least substantially maintain the dimensions of said hot-pressed system; and (f) recovering the resulting composite of polycrystalline diamond body bonded to silicon nitride substrate wherein the diamond crystals are present in an amount from at least 70% by volume up to about but less than 90% by volume of said polycrystalline diamond body, said diamond body being at least substantially pore-free and being free of elemental non-diamond carbon phase in that it does not contain non-diamond elemental carbon phase in an amount detectable by X-ray diffraction analysis.

2. The process of claim 1 wherein said diamond crystals are size-graded ranging from about 1 micron to about 60 microns.

3. The process of claim 1 wherein the amount of fluid infiltrating silicon-rich alloy ranges from about 25% by volume to about 80% by volume of said compressed mass of diamond crystals.

4. The process of claim 1 wherein the density of said compressed mass of diamond crystals ranges from about 71% by volume to about but less than 95% by volume of the volume of the volume of compressed crystals.

5. The process of claim 1 wherein said mass of solid silicon-rich alloy is in particulate form.

6. A process for preparing an integral composite of a polycrystalline diamond body and silicon nitride substrate at pressures substantially below those required by the diamond stable region which includes a hot-pressing step and which comprises:

(a) pressing a cavity in a pressure transmitting powder medium that transmits applied pressure substantially undiminished and remains substantially unsintered during said hot-pressing;

(b) placing within said cavity a mass of solid eutectiferous silicon-rich alloy, or solid components for providing eutectiferous silicon-rich alloy, a mass of diamond crystals and a polycrystalline silicon nitride substrate, said mass of diamond crystals being intermediate and in contact with said substrate and said mass of solid eutectiferous silicon-rich alloy, or with at least one of said components for providing eutectiferous silicon-rich alloy, said eutectiferous silicon-rich alloy being composed of silicon and a metal which forms a silicide with said silicon and which is selected from the group consisting of cobalt, chromium, iron, hafnium, manganese, molybdenum, nickel, palladium, platinum, rhenium, rhodium, ruthenium, tantalum, thorium, titanium, uranium, vanadium, tungsten, yttrium, zirconium, and alloys thereof;

(c) covering said cavity and its contents with an additional amount of said pressure transmitting powder medium thereby enveloping the cavity with said pressure transmitting powder;

(d) applying sufficient substantially isostatic pressure to said cavity and its contents via said powder medium to substantially stabilize the dimensions of said cavity and its contents substantially uniformly producing a shaped substantially isostatic system of powder-enveloped cavity, wherein the density of the resulting compressed mass of diamond crystals is higher than 70% by volume of the volume of said compressed diamond crystals;

(e) hot-pressing the resulting substantially isostatic system producing fluid infiltrating eutectiferous silicon-rich alloy and infiltrating said fluid eutectiferous silicon-rich alloy through the interstices of said compressed mass of diamond crystals and into contact with the contacting surface of said substrate which forms an interface with said compressed mass of crystals, said hot-pressing being carried out at an hot-pressing temperature below 1600° C. under a hot-pressing pressure sufficient to infiltrate said fluid silicon-rich alloy throughout the interstices of said compressed mass of diamond crystals, said solid eutectiferous silicon-rich alloy, or said components for eutectiferous silicon-rich alloy being used in an amount sufficient to produce sufficient fluid eutectiferous silicon-rich alloy at said hot-pressing temperature to fill the interstices of said compressed mass of diamond crystals and contact the contacting surface of said substrate filling the pores through the interface so that it is at least substantially pore-free, said hot-pressing being carried out in an atmosphere which has no significant deleterious effect on said diamond crystals or said infiltrating fluid silicon-rich alloy or on said silicon nitride substrate, said hot-pressing converting less than 5% by volume of said diamond crystals to non-diamond elemental carbon, said infiltrating silicon-rich alloy encapsulating the surfaces of the compressed diamond crystals reacting with the diamond surfaces or non-diamond elemental carbon producing carbide which at least in major amount is silicon carbide;

(f) maintaining sufficient pressure on the resulting hot-pressed substantially isostatic system during cooling thereof to at least substantially maintain the dimensions of said hot-pressed system; and (g) recovering the resulting composite of polycrystalline diamond body bonded to silicon nitride substrate wherein the diamond crystals are present in an amount from at least 70% by volume up to about but less than 90% by volume of said polycrystalline diamond body, said diamond body being at least substantially pore-free and being free of elemental non-diamond carbon phase in that it does not contain non-diamond elemental carbon phase in an amount detectable by X-ray diffraction analysis.

7. The process of claim 6 wherein said mass of solid silicon-rich alloy is in particulate form.

* * * * *